United States Patent [19]

Okamura et al.

[11] Patent Number: 4,786,989
[45] Date of Patent: Nov. 22, 1988

[54] WAVEFORM EQUALIZER FOR SIGNAL REPRODUCED FROM A MAGNETIC RECORDING MEDIUM

[75] Inventors: Hiroshi Okamura; Hiroshi Suzuki, both of Tokyo, Japan

[73] Assignee: Kabushiki Kaisha Toshiba, Kawasaki, Japan

[21] Appl. No.: 30,922

[22] Filed: Mar. 27, 1987

[30] Foreign Application Priority Data

Mar. 31, 1986 [JP] Japan .................. 61-72894

[51] Int. Cl.$^4$ .......................... G11B 5/45; G11B 5/09
[52] U.S. Cl. .................................. 360/65; 333/28 R; 333/138
[58] Field of Search ............... 360/59, 65; 333/18, 333/28 R, 138, 20

[56] References Cited

U.S. PATENT DOCUMENTS

| | | | |
|---|---|---|---|
| 3,408,640 | 10/1968 | Masson | 340/174.1 |
| 4,535,417 | 8/1985 | Peacock | 364/724 |
| 4,633,200 | 12/1986 | Adler | 360/65 |
| 4,635,143 | 1/1987 | Suzuki et al. | 360/65 |

FOREIGN PATENT DOCUMENTS 2100495 12/1982 United Kingdom .................. 360/65

OTHER PUBLICATIONS

Telecommunications radio engineering, vols. 29-30; pp. 114-120, 1975.
IEEE Transactions on Magnetics, vol. MAG-18, No. 6, Nov. 1982, pp. 1247-1249.
IEEE Transactions on Magnetics, vol. MAG-12, No. 6; Nov. 1976, pp. 746-748.

*Primary Examiner*—Raymond F. Cardillo
*Assistant Examiner*—Kevin Fournier
*Attorney, Agent, or Firm*—Foley & Lardner Schwartz, Jeffery Schwaab, Mack Blumenthal & Evans

[57] ABSTRACT

In a waveform equalizer of the present invention, first and second Hilbert-transform signals are formed from a parallel-reproduced signal, and a desired signal is obtained from these signals by an operational amplifier. The waveform equalizer includes a reflecting section having a plurality of resistors, and a switching section for selecting one of the resistors in accordance with a control signal. Therefore, the waveform equalizer can process a plurality of reproduced signals which have different ratios of the longitudinal signal component to the perpendicular signal component without being affected by inphase noise.

14 Claims, 4 Drawing Sheets

WAVEFORM EQUALIZER FOR SIGNAL REPRODUCED FROM A MAGNETIC RECORDING MEDIUM

BACKGROUND OF THE INVENTION

The present invention relates to a waveform equalizer for equalizing the waveform of a signal reproduced from a magnetic recording medium.

In a signal recording/reproduction system using a magnetic recording medium, any signal reproduced by a ring-shaped head from a longitudinal magnetic recording medium (wherein a magnetic field corresponding to the recorded data is oriented along the longitudinal direction of the medium) has a Lorentz waveform, as is shown in FIG. 3A. The discrimination of this signal is usually performed by a peak detection technique using differentiation.

On the other hand, any signal reproduced from a perpendicular magnetic recording medium (wherein the magnetic field is oriented along the perpendicular direction to a surface thereof) is point-symmetrical at about the zero amplitude, as is shown in FIG. 3B. Therefore, a zero-cross detection technique can be used for data discrimination.

The signal reproduced from the perpendicular magnetic recording medium is a composite signal consisting of the signal of FIG. 3A (referred to as "longitudinal signal" hereinafter) and the signal of FIG. 3B (referred to as "perpendicular signal" hereinafter). FIGS. 3A and 3B show ideal longitudinal and perpendicular waves, respectively. FIG. 3, however, is not ideal; rather it is a signal actually obtained in practice.

The longitudinal signal and perpendicular signal have a relation of the Hilbert transform, as V. B. Minukhin pointed out in *Phase Distortions of Signals in Magnetic Recording Equipment*, Telecommunications Radio Engineering, Vols. 29-30, pp. 114-120, 1975.

A method using this relationship is proposed by B. J. Langland in *Phase Equalization for Perpendicular Recording*, IEEE Trans. on Magn., MAG-18, pp. 1247-1249, 1982. As is shown in FIG. 1, signal fr input to Hilbert transform filter 1 is Hilbert-transformed, and is supplied to combiner 4. Signal fr is also input to delay line 2. The delayed signal is amplified by amplifier 3 and supplied to combiner 4. Combiner 4 combines the Hilbert-transformed signal with the delayed signals and a longitudinal signal. However, this reference does not disclose the detailed arrangement of the Hilbert transform filter.

A transversal filter method which is designed to realize the Hilbert transform filter and which uses a tapped delay terminated by its characteristic impedance is disclosed in U.S. Pat. No. 3,408,640 (1968) to Masson. Also, a method for converting the waveform (in a digital form) to a desired waveform is disclosed in U.S. Pat. No. 4,535,417 (1985) to Peacock. However, the Masson filter needs many taps on the delay line, and the Peacock method requires complicated circuits.

"Improvement of Recording Density by Means of a Cosine Equalizer" by T. Kameyama et al. discloses a method using a delay line whose one end is opened to generate the reflection signal. The reflection signal has the same polarity as an input signal of the delay line. Therefore, this method cannot achieve the Hilbert transform.

A small, low-cost Hilbert transform filter of the structure shown in FIG. 2 is disclosed in U.S. Pat. No. 4,635,143 (Jan. 6, 1987) by Imamura and Suzuki. Suzuki is one of the applicants of the present application. The application has been assigned to the assignee of the present application. In the waveform equalizer described and claimed in the application, it is difficult to process the reproduced signals, in which the ratios of the longitudinal signal component to the perpendicular signal component is different, from a plurality of magnetic heads. Also, the waveform equalizer has a shortcoming in that it is affected by in-phase noise.

SUMMARY OF THE INVENTION

The present invention has been made in consideration of the problems described above, and has as an object to provide a waveform equalizer which can equalize, to a predetermined waveform without degradation of S/N ratio by in-phase noise, reproduced signals in which ratios of the longitudinal signal component to the perpendicular signal component are different.

According to the invention, there is provided a waveform equalizer for equalizing a waveform of a parallel signal reproduced from a magnetic record medium, which comprises:

delaying means including first and second delay lines each having a receiving end and a terminating end, for receiving the parallel-reproduced signal at the receiving ends, the first and second delay lines each having at least one tap;

reflecting means connected between the terminating ends, for reflecting a part of the parallel-reproduced signal supplied to the receiving ends and for transmitting a remaining part of the parallel reproduced signal;

first weighting means for weighting a first tap signal from the first delay line;

second weighting means for weighting a second tap signal from the second delay line;

first combining means for adding a first signal transmitted from the terminating end of the first delay line and the weighted first tap signal in accordance with a relation predetermined by the impedance of the reflecting means to produce a first Hilbert-transform signal;

second combining means for adding a second signal transmitted from the terminating end of the second delay line and the weighted second tap signal in accordance with the predetermined relation to produce a second Hilbert-transform signal; and operation amplifier means for calculating the difference between the first and second Hilbert-transform signals.

Further, a waveform equalizer is provided, which can equalize a plurality of reproduced signals, each having a different ratio of the longitudinal signal component to the perpendicular signal component, said equalizer comprising:

delaying means including a delay line having a receiving end and a terminating end, for receiving the reproduced signal at the receiving end, the delay line having at least one tap;

reflecting means having a plurality of resistors, for reflecting a part of the reproduced signal supplied to the receiving end using a selected resistor from the plurality of resistors and for transmitting a remaining part of the reproduced signal;

switching means for selecting one from the plurality of resistors in the reflecting means in accordance with a control signal;

weighting means for weighting a tap signal from the delay line; and combining means for adding a transmitted signal from the terminating end of the delay line and the weighted tap signal in accordance with resistance of the selected resistor to produce a Hilbert-transform signal.

According to the present invention, reproduced signals in which the ratios of the longitudinal signal component to the perpendicular signal component are different can be equalized to a predetermined waveform. At this time, the reproduced signals are reflected by a resistor having an optimum resistance selected in accordance with the ratios. Further, degradation of the S/N ratio of the obtained signal can be prevented since the equalizer is designed to process the parallel-reproduced signal using tapped dual delay lines.

DETAILED DESCRIPTION OF THE PREFERRED EMBODIMENT

A waveform equalizer of the present invention will be described in detail with reference to the accompanying drawings.

First, a principle of the present invention will be described with reference to FIGS. 4A to 5.

It is well known that a signal f(t) is related to a signal g(t) in accordance with the Hilbert transform as follows:

$$g(t) = \int_{-\infty}^{+\infty} f(\tau) \cdot \{1/(t - \tau)\} d\tau \quad (1)$$

Figure 4A:
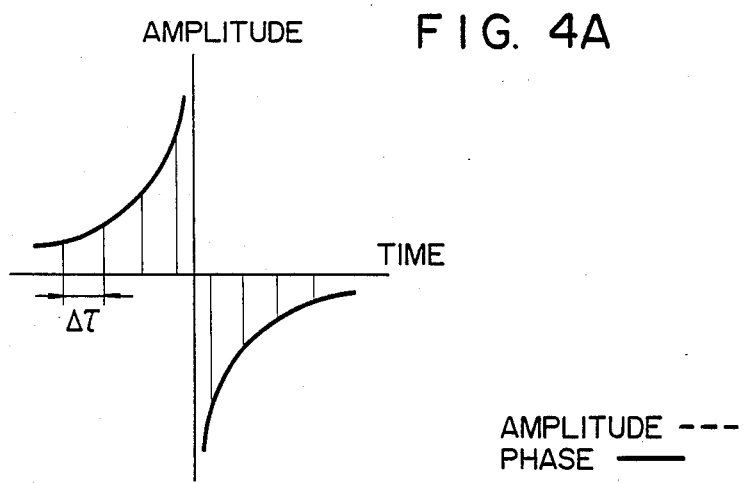
FIGS. 4A and 4B show impulse response characteristics and frequency characteristics of a Hilbert transform filter.

$1/(t-\tau)$ in the integration corresponds to an impulse response shown in FIG. 4A. Thus, it is apparent from equation (1) that the Hilbert-transformed signal g(t) for the signal f(t) is obtained if the signal f(t) is integrated with respect to a time from $-\infty$ to $+\infty$, using the impulse response characteristics as weighting coefficients. Thus, the Hilbert-transformed signal can be obtained by a transversal filter. In the filter, a tapped delay line having a large number of taps must be used. However, since the transversal filter requires a large number of taps, the resultant filter is large in size. The impulse response characteristic is a point-symmetry with respect to an origin. Utilizing this feature of the characteristics, Suzuki et al. disclosed the Hilbert transform filter having only a half of the number of taps in transversal filter, by reflecting an incident signal such that a reflected signal has an inverse polarity.

Rewriting equation (1) into the frequency-domain representation.

$$G(f) = e^{-j(\pi/2)sgn(f)} \cdot F(f) \quad (2)$$

where $$G(f) = \int_{-\infty}^{+\infty} g(t) \cdot e^{j2\pi ft} dt$$

$$F(f) = \int_{-\infty}^{+\infty} f(t) \cdot e^{j2\pi ft} dt$$

$$sgn(f) = \begin{cases} -1 & f < 0 \\ 0 & f = 0 \\ +1 & f > 0 \end{cases}$$

Figure 4B:
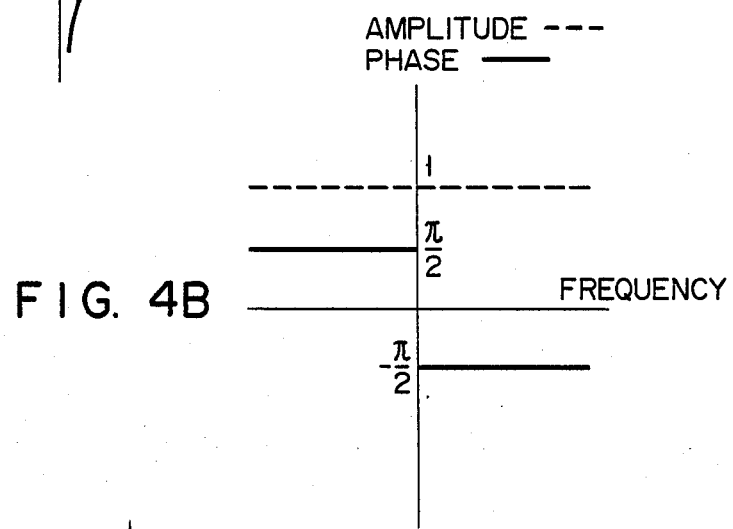

The frequency characteristics of the filter for achieving the Hilbert transform is illustrated in FIG. 4B. As is apparent from equation (2) and FIG. 4B, the amplitude characteristics of the Hilbert transform filter is flat, with no degradation of the S/N ratio.

Figure 5:
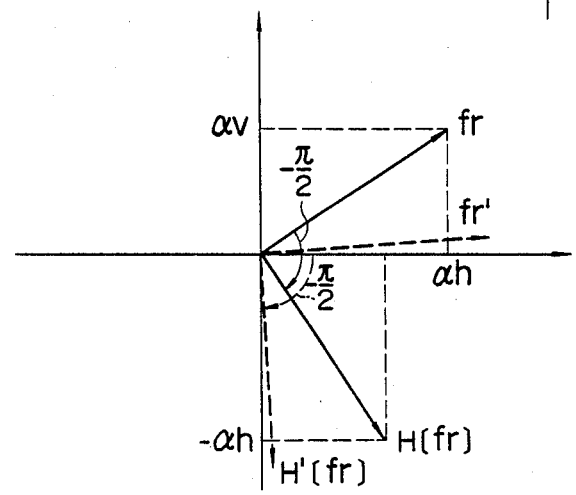
FIG. 5 shows the composite waveform and a Hilbert-transformed signal on a complex plane.

Assuming that the reproduced signal fr, which is the composite signal of the longitudinal signal component and the perpendicular signal component, is input to the Hilbert transform filter, the Hilbert-transformed signal H[fr] having $-\pi/2$ of delay in phase is obtained as shown in FIG. 5. If the longitudinal signal component and the perpendicular signal component of the input-reproduced signal fr are $\alpha h$ and $\alpha v$, the longitudinal signal component and the perpendicular signal component of the Hilbert-transformed signal H[fr] are ideally $\alpha v$ and $-\alpha h$.

Therefore, in order to extract the longitudinal signal, the input-reproduced signal is added to the Hilbert-transformed signal multiplied with $\alpha v/\alpha h$ or the Hilbert-transformed signal is added to the input-reproduced signal multiplied with $\alpha h/\alpha v$. Also, in order to extract the perpendicular signal from the input-reproduced signal, the input-reproduced signal is subtracted by the Hilbert-transformed signal multiplied by $\alpha h/\alpha v$ or the Hilbert-transformed signal is subtracted form the input-reproduced signal multiplied by $\alpha v/\alpha h$.

In order to assist the understanding of a waveform equalizer according to the present invention, a waveform equalizer will be described with reference to FIG. 2. In this waveform equalizer, an output signal of weighting adder 117 is combined with an output signal of tapped delay line 113.

Figure 1:
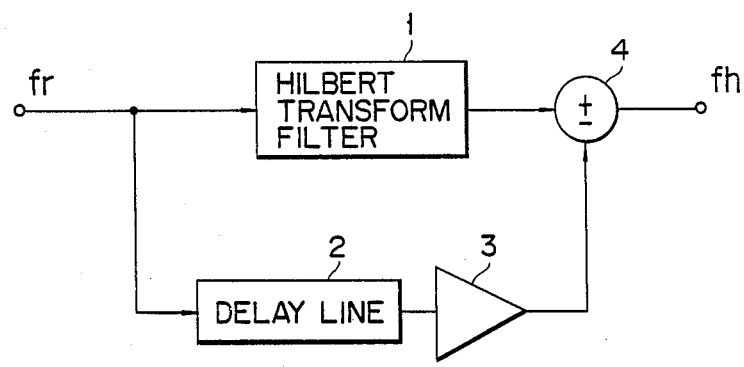
FIGS. 1 and 2 show arrangements of conventional waveform equalizers, respectively.
Figure 2:
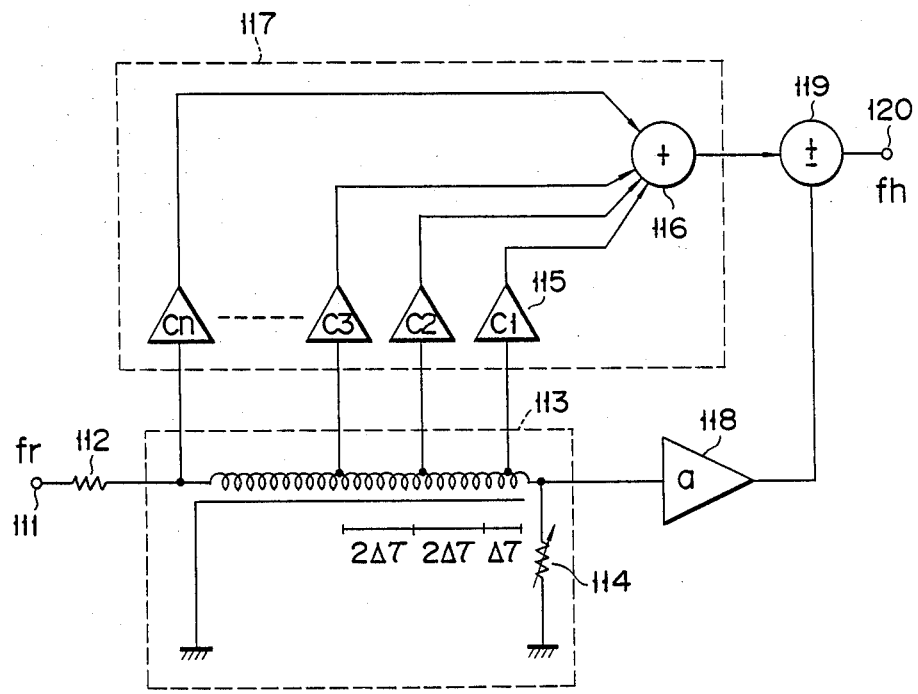
Figure 3A:
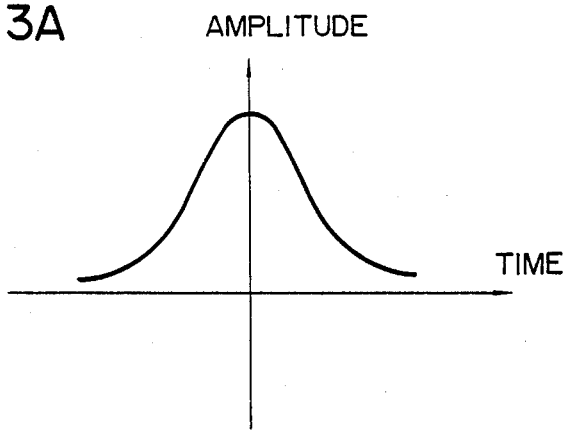
FIGS. 3A to 3C show an ideal longitudinal signal, an ideal perpendicular signal and an actual signal, respectively.
Figure 3B:
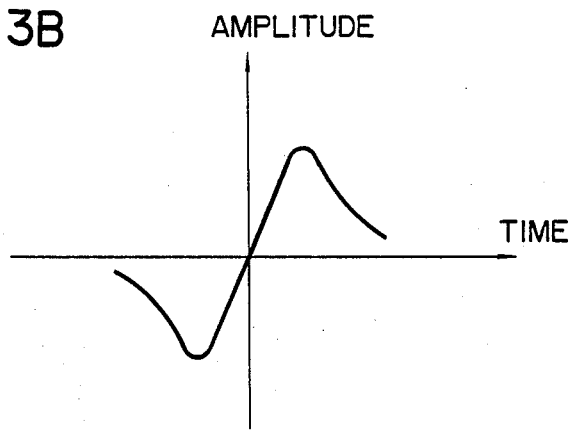
Figure 3C:
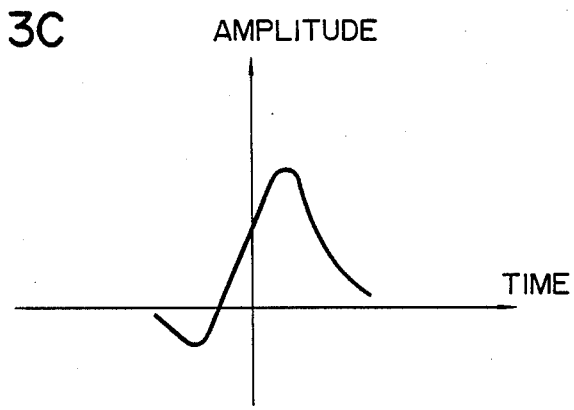

Referring to FIG. 2, a signal reproduced from a magnetic recording medium is supplied from input terminal 111 to tapped delay line 113 through matching resistor 112. The terminating end of tapped delay line 113 is terminated through a variable resistor 114 as a reflecting element.

Tap signals from the respective taps of tapped delay line 113 are added together by a weighting adder 117 which comprises weighting elements 115 connected to respective taps and an adder 116 for adding outputs of weighting elements 115. A transmitted signal taken from the terminating end of tapped delay line 113 is amplified by amlifier 118. An output of amplifier 118 is combined with an output of weighting adder 117 in combiner 119 to provide an equalized output at output terminal 120.

The operation of the conventional waveform equalizer will now be described. Assume that a signal (reproduced original waveform) applied to receiving terminal 111 is $$f\{t+(2N-1)\Delta\}$$

where N is the number of taps of tapped delay line 113 and $\Delta\tau$ is a unit delay time. A signal x appearing at the terminating end of tapped delay line 113 is given by $$\begin{aligned} x &= f(t) + f(t)(R - ZO)/(R + ZO) \\ &= 2Rf(t)/(R + ZO) \end{aligned} \quad (3)$$

where R is the resistance of variable resistor 114, and ZO is the characteristic impedance of tapped delay line 113.

It should be noted that the signal x appearing at the terminating end of tapped delay line 113 is delayed by a total delay time $(2N-1)\Delta\tau$ of tapped delay line 113.

A signal yn appearing at the nth tap is given as follows:

$$yn = f(t+(2n-1)\Delta\tau)+(R-ZO)f\{t-(2n-1)\Delta\tau\}/(R+ZO) \quad (4)$$

The weighting coefficient (tap gain) Cn defined by resistance of each weighting element 115 connected to the corresponding tap is set in proportion to $1/(2n-1)$. In other words, a weighting of $1/(2n-1)$ is performed for the signal having the delay time of $(2n-1)\Delta\tau$ from the terminating end of tapped delay line 113. For example, if $Cn=1/(2n-1)$, an output y of weighting adder 117 becomes:

$$y = \left[ (R + ZO) \cdot \sum_{n=1}^{N} Cn\{f(t + (2n - 1)\Delta\tau\} + (R - XO) \cdot \sum_{n=1}^{N} Cn\{f(t - (2n - 1)\Delta\tau\} \right]/(R + ZO) \quad (5)$$

When the gain of amplifier 118 is given as a, an output g(t) of combiner 119 is given by $$\begin{aligned} g(t) &= y \pm ax \quad (6) \\ &= \left[ R \left[ \sum_{n=1}^{N} Cn\{f(t + (2n - 1)\Delta\tau) + f(t - (2n - 1)\Delta\tau)\} \pm 2af(t) \right] + ZO \cdot \sum_{n=1}^{N} Cn\{f(t + (2n - 1)\Delta\tau) - f(t - (2n - 1)\Delta\tau\} \right]/(R + ZO) \end{aligned}$$

The second term in [] represents the Hilbert transform of the reproduced original waveform, and the first term in [] becomes substantially $\pm 2Raf(t)$, which is proportional to a waveform obtained by delaying the reproduced original waveform a predetermined time under the assumption that the gain a of amplifier 118 is set so as to satisfy $$\sum_{n=1}^{N} Cn \ll a \quad (7)$$

Equation (6) can be thus rewritten as follows:

$$g(t) = \left[ \pm 2Raf(t) + ZO \cdot \sum_{n=1}^{N} Cn\{f(t + (2n - 1)\Delta\tau) - f(t - (2n - 1)\Delta\tau)\} \right]/(R + ZO) \quad (8)$$

The above equation indicates that the Hilbert-transformed waveform and the delayed waveform of the original waveform are combined at a predetermined ratio based on the resistance R of variable resistor 114.

To extract the longitudinal signal component from the composite signal, the resistance R is adjusted such that the ratio of the Hilbert-transformed signal to the delayed signal becomes $\alpha v/\alpha h$, to be subsequently added together by combiner 119. On the other hand, when the perpendicular signal component is to be extracted from the composite signal, the resistance R is adjusted such that the ratio of the Hilbert-transformed signal to the delayed signal is set to $\alpha h/\alpha v$. Thereafter, these waveforms are subtractively combined by combiner 119.

Figure 6:
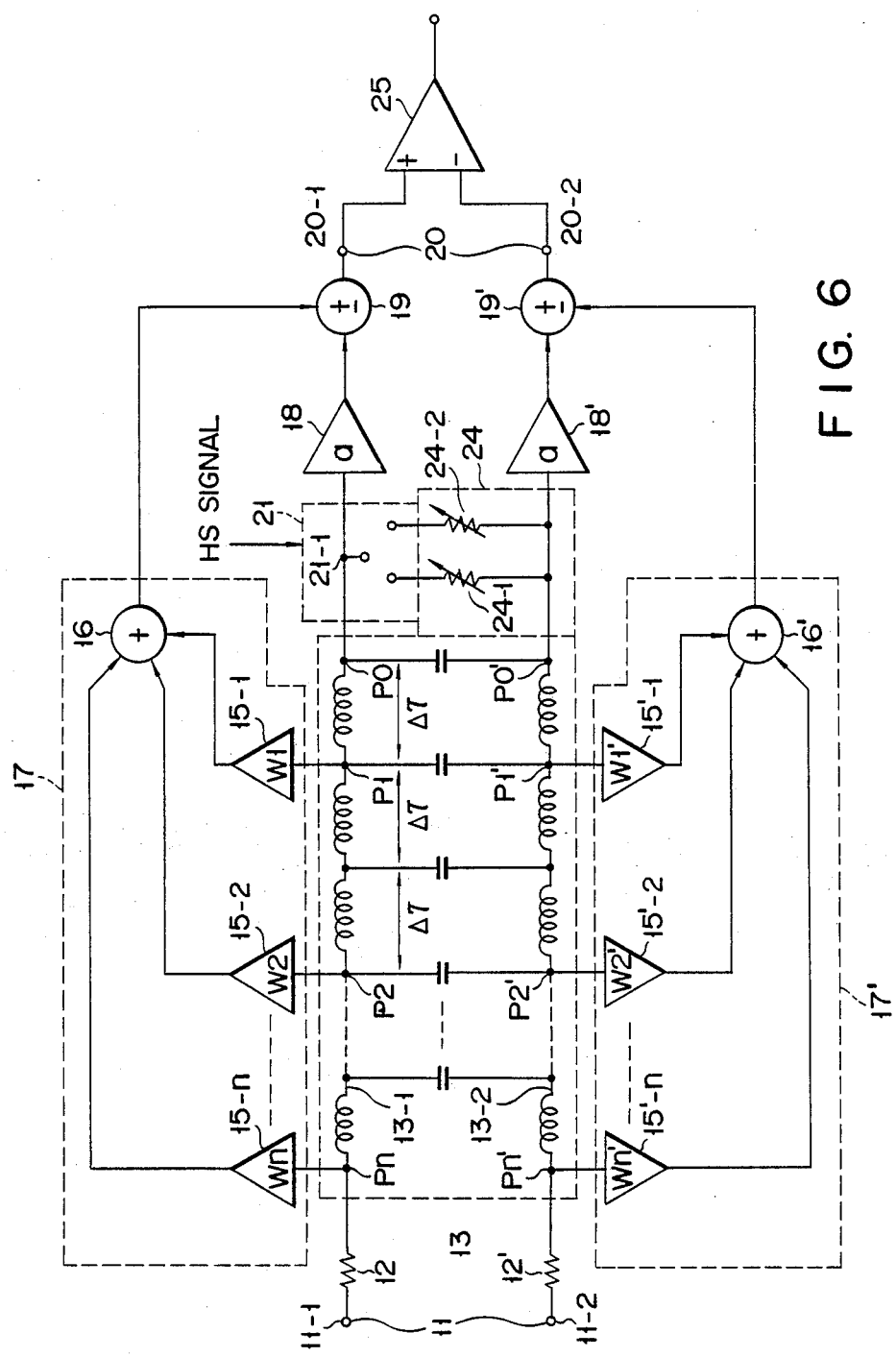
FIG. 6 shows an arrangement of a waveform equalizer according to an embodiment of the present invention.

Next, an embodiment of a waveform equalizer according to the present invention will be described in detail with reference to FIG. 6.

In the present invention, the reproduced signal input to the waveform equalizer is a parallel signal. The parallel-reproduced signal is received at the receiving terminals of tapped dual delay lines 13 via matching resistors 12 and 12'. Tapped dual delay lines 13 are LC delay lines and are coupled to each other by capacitive elements. Each of dual delay lines 13 has at least one tap, and n taps P1 to Pn or P1' to Pn' in this embodiment. A delay time between terminating end P0 or P0' and tap P1 or P1' is $\Delta\tau$ and the delay time between taps is $2\Delta\tau$. Weighting adders 17 and 17' are similar to weighting adder 117 shown in FIG. 2, and weighting elements 15-1 to 15-n and 15'-1 to 15'-n are connected to corresponding taps, respectively. Each weighting element weights a tap signal from the corresponding tap with a predetermined weight coefficient. The weighted tap signals are added together by adder 16 and 16', and the added results or Hilbert-transformed signals are supplied to combiners 19 and 19'.

Switching section 21 and reflecting section 24 are connected between terminating ends P0 and P0' of tapped dual delay line 13 in series. Reflecting section 24 has a plurality of variable resistors, and two variable resistors in this embodiment. Control signal HS is supplied to switching section 21, and one variable resistor is selected by switching section 21 in accordance with the control signal HS. A part of the parallel-reproduced signal input to terminating end P0 and P0' is reflected by the selected variable resistor and the remaining part of the parallel-reproduced signal is transmitted and supplied to amplifiers 18 and 18'. Amplifiers 18 and 18' are also similar to amplifier 118 shown in FIG. 2. Amplified signals are supplied to combiners 19 and 19'.

Combiners 19 and 19' are similar to combiner 119 shown in FIG. 2, and combine the Hilbert-transformed signal from adder 16 or 16' with the delayed signal from amplifier 18 or 18'. The combined signals by combiners 19 and 19', i.e., longitudinal signal components or perpendicular signal components, are output to operational amplifier 25. The combined signals still include inphase noise. The difference between these combined signals is calculated in operational amplifier 25, and the resultant longitudinal or perpendicular signal component does not include inphase noise.

Thus, the longitudinal or perpendicular signal component not affected by inphase noise can be obtained.

In the present invention, a part of the parallel-reproduced signal input to terminating ends P0 and P0' is reflected by selected variable resistor 24-1 or 24-2. Therefore, a suitable resistor must be selected to equalize a plurality of reproduced signals, each having a different ratio of the longitudinal signal component to the perpendicular signal component. More specifically, if the amplitudes of the longitudinal and perpendicular signal components are approximately equal, no problem occurs. However, when the amplitude of either the longitudinal or the perpendicular signal component is too low, a problem does occur. Assuming that the amplitude of the longitudinal signal component is low, the perpendicular signal component of the obtained Hilbert-transformed signal is also too low. As a result, the reliability of the obtained longitudinal or perpendicular signal is low. To prevent this problem, a reflective resistor is selected such that much of the input-reproduced signal is reflected when the amplitude of either the longitudinal or the perpendicular signal component is too low.

Various changes and modifications may be made within the spirit and scope of the present invention. For example, in order to convert a longitudinal signal to a perpendicular signal, a waveform equalizer may be arranged by only a Hilbert transform filter comprising a tapped dual line and a weighting adder. Also, a waveform equalizer according to the present invention may be used to equalize the reproduced signal, which has both longitudinal and perpendicular signal components from a longitudinal magnetic recording medium, to the longitudinal signal component.

The tapped dual delay lines may have only the input tap, without intermediate taps. Also, the waveform equalizer comprises the adder, the amplifier and the combiner, separately. However, an operational amplifier may also be used to simultaneously achieve those functions of the adder, the amplifier, and the combiner. The reflecting resistor is not limited to a variable resistor.

What is claimed is:

1. A waveform equalizer for equalizing a waveform of a parallel signal reproduced from a magnetic record medium, comprising:
   delaying means including first and second delay lines each having a receiving end and a terminating end, for receiving the parallel-reproduced signal at said receiving ends, each of said first and second delay lines having at least one tap;
   reflecting means connected between said terminating ends, for reflecting a part of the parallel-reproduced signal supplied to said receiving ends and for transmitting a remaining part of the parallel-reproduced signal;
   first weighting means for weighting a first tap signal from said first delay line;
   second weighting means for weighting a second tap signal from said second delay line;
   first combining means for adding a first transmitted signal from the terminating end of said first delay line and the weighted first tap signal in accordance with a relation predetermined by the impedance of said reflecting means to produce a first Hilbert-transform signal;
   second combining means for adding a second transmitted signal from the terminating end of said second delay line and the weighted second tap signal in accordance with the predetermined relation to produce a second Hilbert-transform signal; and
   operation amplifier means for calculating the difference between the first and second Hilbert-transform signals.

2. The waveform equalizer according to claim 1, wherein said reflecting means comprises a resistive element.

3. The waveform equalizer according to claim 2, wherein resistance of said resistive element is selected such that the reflected signal at said terminating ends has a polarity opposite to the parallel-reproduced signal supplied to said terminating ends.

4. The waveform equalizer according to claim 1, wherein said reflecting means comprises a plurality of resistive elements, and which further comprises means for selecting one from the plurality of resistive elements in accordance with a control signal.

5. The waveform equalizer according to claim 1, wherein said first and second delay lines each have a plurality of taps, and said first and second weighting means weight the first and second tap signals in accordance with weighting coefficients, each inversely proportional to a delay time between a corresponding tap and said terminating end, respectively.

6. The waveform equalizer according to claim 5, wherein said first weighting means further comprises first adding means for adding together the weighted first tap signal, and said second weighting means further comprises second adding means for adding together the weighted second tap signal.

7. The waveform equalizer according to claim 5, wherein the plurality of taps of said first and second delay lines are arranged such that the delay time between taps is predetermined and such that the delay time between said terminating end and the nearest tap to said terminating end is half the predetermined delay time.

8. The waveform equalizer according to claim 1, wherein said first combining means further comprises first amplifying means for amplifying the first transmitted signal with a first predetermined gain, and said second combining means further comprises second amplifying means for amplifying the second transmitted signal with a second predetermined gain.

9. The waveform equalizer according to claim 1, wherein said first and second combining means add the first transmitted signal and the weighted first tap signal, and the second transmitted signal and the weighted second tap signal, respectively, in order to obtain a longitudinal signal component from the parallel-reproduced signal, and calculate a difference between the first transmitted signal and the weighted first tap signal, and a difference between the second transmitted signal and the weighted second tap signal, respectively, in order to obtain a perpendicular signal component.

10. A waveform equalizer for equalizing a plurality of reproduced signals, each having a different ratio of longitudinal signal component to perpendicular signal component, comprising;

delaying means including a delay line having a receiving end and a terminating end, for receiving the reproduced signal at said receiving end, said delay line having at least one tap;

reflecting means including a plurality of resistors for reflecting part of the reproduced signal supplied to said receiving end, a selected resistor from said plurality of resistors transmitting the remaining part of the reproduced signal, the terminating resistance of each of said resistors being selected by means of a control system such that the reflected signal at said terminating end has a polarity opposite to the reproduced signal supplied to said terminating ends;

switching means for selecting one from the plurality of resistors in said reflecting means in accordance with a control signal;

weighting means for weighting a tap signal from said delay line; and combining means for adding a transmitted signal from the terminating end of said delay line and the weighted tap signal in accordance with resistance of the selected resistor to produce a Hilbert-transform signal.

11. The waveform equalizer according to claim 10, wherein said delay line has a plurality of taps, and said weighting means weights the tap signal in accordance with weighting coefficients inversely proportional to a delay time between a corresponding tap and said terminating end.

12. The waveform equalizer according to claim 12, wherein said weighting means further comprises first adding means for adding together the weighted tap signal.

13. The waveform equalizer according to claim 11, wherein the plurality of taps of said delay line are arranged such that the delay time between taps is predetermined and such that the delay time between said terminating end and the nearest tap to said terminating end is half the predetermined delay time.

14. The waveform equalizer according to claim 10, wherein said combining means further comprises amplifying means for amplifying the transmitted signal with a predetermined gain.

* * * * *